United States Patent [19]
de Sivry et al.

[11] 4,368,374
[45] Jan. 11, 1983

[54] VACUUM CHAMBER FOR ELECTRON BEAM BUTT WELDING OF PIPES

[75] Inventors: Bruno de Sivry, Paris; Bernard Sudreau, Puteaux; Claude Carsac, St Leu la Foret; Jean-Pierre Hamon, Cergy; Michel Fuzeau, Parthenay, all of France

[73] Assignee: Compagnie Francaise des Petroles, Paris, France

[21] Appl. No.: 256,210

[22] Filed: Apr. 21, 1981

[30] Foreign Application Priority Data
Apr. 25, 1980 [FR] France .................. 80 09344

[51] Int. Cl.³ ............................ B23K 15/00
[52] U.S. Cl. .............. 219/121 EN; 219/121 EC; 219/121 EL
[58] Field of Search ............ 219/121 EC, 121 ED, 219/121 EL, 121 EN, 121 EX

[56] References Cited
U.S. PATENT DOCUMENTS
3,483,351 12/1969 Wood ..................... 219/121 EN
3,493,711 2/1970 Terselic et al. ........... 219/121 EN FOREIGN PATENT DOCUMENTS
2919813 11/1979 Fed. Rep. of Germany ...... 219/121 EN Primary Examiner—C. L. Albritton
Attorney, Agent, or Firm—Sughrue, Mion, Zinn, Macpeak and Seas

[57] ABSTRACT

A welding chamber in which a vacuum is created for welding, using an electron beam, elongate pieces extending centrally of the chamber. The welding chamber is divided into a central sub-enclosure 41 for receiving the pieces 1, 2 to be welded and which is evacuated during welding, and a peripheral sub-enclosure 42 in which the welding means are located and which is permanently evacuated, the two sub-enclosures being separated by retractable sealing gaskets 12, 26, 27 which are retracted during welding to place the two sub-enclosures in communication.

11 Claims, 1 Drawing Figure

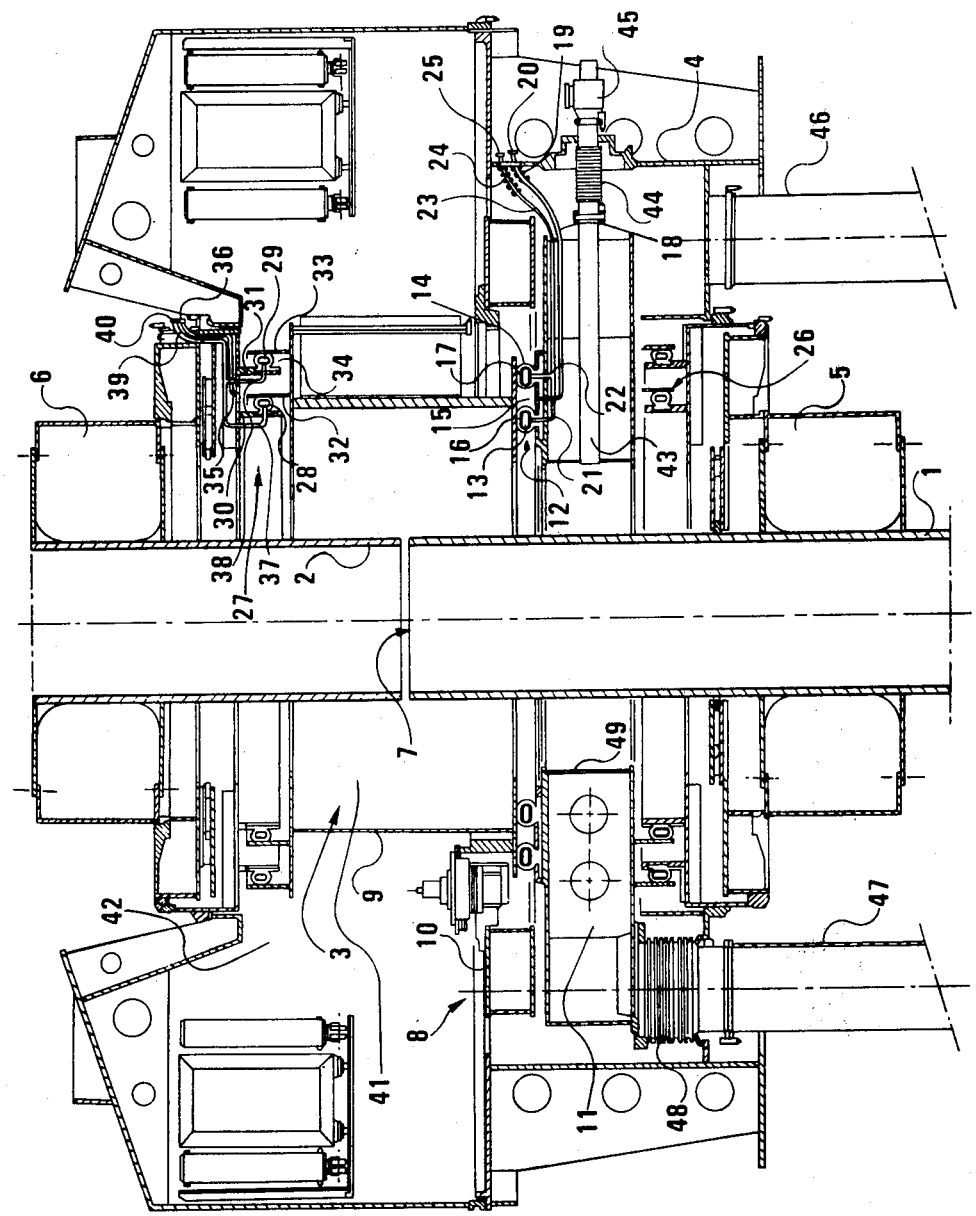

VACUUM CHAMBER FOR ELECTRON BEAM BUTT WELDING OF PIPES

BACKGROUND OF THE INVENTION

The present invention relates to a vacuum welding chamber intended for the butt welding, by an electron beam, of two elongate pieces which extend in their longitudinal direction at the centre of this welding chamber. Electron beam welding has appreciable advantages because it is suitable for pieces of high thickness, because it permits rapid and automated welding operations and because it does not require a heat treatment, but it requires the installation of a leak-tight envelope for creating an enclosure in which it is possible to create the vacuum essential for the welding operation. Now, in the case of elongate pieces of large dimensions, the enclosure created in this way has a very large volume which it is time-consuming and expensive to re-evacuate for each welding operation after it has been returned to atmospheric pressure as a result of introducing a new elongate piece into the welding chamber.

SUMMARY OF THE INVENTION

The present invention proposes to reduce the volume which is alternately returned to atmospheric pressure and evacuated, whilst at the same time having the benefit of a large degassing volume.

According to one aspect of the invention there is provided a vacuum welding chamber for use in the butt welding by an electron beam of two elongate pieces which extend in their longitudinal direction at the centre of the chamber, comprising an envelope for containing at least one electron gun and associated equipment for supporting, positioning and displacing the or each electron gun and retractable sealing means for sealing respectively against each of the two elongate pieces and provided at the longitudinal ends of said envelope, wherein said enclosure is divided into two parts, being a central sub-enclosure for receiving the elongate pieces when said sealing means are retracted, and a peripheral sub-enclosure for containing the or each said electron gun and said associated equipment, said sub-enclosures being capable of communicating with each other by means of retractable sealing gaskets distributed longitudinally between said envelope and said equipment and inside said equipment.

The retractable sealing gaskets are preferably inflatable gaskets each comprising a pair of elementary gaskets arranged parallel to one another, means being provided for evacuating the intermediate space provided between the two elementary gaskets.

The connecting tubes connecting the inflatable gaskets or the intermediate spaces located inside the said equipment to the outside of the envelope advantageously comprise at least one flexible and extensible portion.

The retractable sealing gaskets arranged between the envelope and the equipment are preferably provided between baffles and act transversely. Advantageously, their arrangement and their dimensions are substantially identical at both the longitudinal ends of the envelope.

For evacuating the enclosure, it is advantageous to provide at least one pumping tube opening in the central sub-enclosure and connected to a first pumping installation, and at least one other pumping tube opening in the peripheral sub-enclosure and connected to a second pumping installation.

BRIEF DESCRIPTION OF THE DRAWINGS

Other features and advantages of the invention will become apparent from the description of an embodiment of the invention given, by way of example only, with reference to the accompanying drawing of which the single FIGURE shows, in longitudinal section, an embodiment of a welding chamber for welding sections of a pipe for conveying hydrocarbons, in particular during the so-called "J-laying" of a pipe in the sea. It will however be obvious that analogous arrangements can be used for the welding, on land, of solid or hollow elongate pieces extending in the longitudinal direction and at any inclination.

DETAILED DESCRIPTION OF THE PREFERRED EMBODIMENT

As shown in this drawing, a first elongate piece or a first pipe section 1 is to be welded, at its upper end, to a second elongate piece or a second pipe section 2, by means of electron beam welding carried out in a welding chamber providing an enclosure 3 in which welding is to be effected and which is delimited by an envelope 4 and sealing means, which comprise inflatable sealing elements 5 and 6 carried by the longitudinal ends of the envelope 4. The elements 5, 6 are applied, in their inflated state, against the pipe sections 1 and 2, an internal sealing member, which is not shown, being inserted inside the elongate pieces, where they are hollow as in the present case, in order to ensure therein the internal leaktightness of the welding zone, by sealing against the internal surfaces of the sections 1 and 2, on either side of the joining surface 7 of the latter.

The electron gun or guns, which are not shown, are carried by equipment 8 comprising in particular, a gun-carrying ring 9, an inclination plate 10 and a ring 11 which carries arms, which are not shown, for gripping the pipe section 1 and rigidly fixing the whole of the equipment 8 thereto.

The elements constituting the equipment 8 are to a degree longitudinally stacked and the rings 9 and 11, which are separated from one another to permit inclination and rotation of the ring 9 relative to the ring 11, constitute a leaktight wall extending from one longitudinal end of the envelope 4 to the other, by virtue of a retractable sealing gasket 12 comprising a pair of inflatable annular elementary gaskets 13 and 14, between which there is an evacuated intermediate space 15. This gasket 12 has a movement which makes it possible to preserve its leaktightness when, with only the peripheral sub-enclosure 42 referred to hereafter being under vacuum, the rings 9 and 11 move relative to one another for the exact positioning of the electron gun or guns, following an operation for sensing the cross-section of the pipe section 1 to which the pipe section 2, for example, is to be joined.

The elementary gaskets 13 and 14 act and exert their pressure in the longitudinal direction. They are carried by the ring 11 and bear against the ring 9 via grooved surfaces 16, 17. The vacuum is created in intermediate space 15 via a tube 18 comprising a flexible and extensible portion 19 and which leaves the enclosure 3 via a connector 20. The pumping installations outside the envelope 4, which are connected to connector 20 and which are of a conventional type, have not been shown. The elementary gaskets 13 and 14 are inflated via tubes 21 and 22, which as shown are combined in a tube 23, provided with a flexible and extensible portion 24 and which leaves the enclosure 3 via a connector 25. The tubes 21, 22 could be joined to the outside separately, it being possible for the elementary gasket 14, which, in operation, is surrounded by a vacuum, to be inflated to a lower pressure or even to be simply at atmospheric pressure. The inflation installations outside the envelope 4, which are connected to tubes 21, 22 and which are conventional, have not been shown.

At the longitudinal ends of the envelope 4, retractable sealing gaskets 26 and 27 ensure the leaktightness between this envelope 4 and, respectively, the ring 11 and the ring 9. As these two gaskets 26 and 27 are identical, only one of them, namely the gasket 27, will be described. This gasket 27 comprises a pair of inflatable annular elementary gaskets 28 and 29 carried by cylindrical ribs 30 and 31 integral or fast with the envelope 4 and forming baffles with cylindrical ribs 32 and 33 carried by the ring 9. These elementary gaskets 28, 29 act and exert their pressure in a transverse and radial direction and each of their faces bearing against the ribs 32 and 33 is grooved.

The intermediate space 34 between the elementary gaskets 28 and 29 is evacuated via a tube 35 which leaves the enclosure 3 via a connector 36. The elementary gaskets 28 and 29 are inflated via tubes 37 and 38, which as shown are combined in a tube 39 which leaves the enclosure 3 via a connector 40, but which could be separated in order to apply different pressures to the two elementary gaskets, as has already been explained in respect of the elementary gaskets 13 and 14.

A radial action of the elementary gaskets 28, 29 has been preferred to a longitudinal action in order to reduce the movements at the level of the gaskets during the exact positioning of the electron gun or guns. It is important for the arrangement and the dimensions of the gaskets 26 and 27 to be substantially identical, in order to avoid mechanical overloading when only the peripheral sub-enclosure 42 referred to hereafter is under vacuum.

The set of gaskets 12, 26 and 27 divide the chamber 3 into two parts, namely a central sub-enclosure or lock 41 and a peripheral sub-enclosure 42, which can either be separated from one another or brought into communication with one another, according to whether the gaskets 12, 26 and 27 are inflated and operative or retracted and inoperative.

A tube 43 provided with a flexible and extensible portion 44 joins the lock 41 to an air inlet valve 45, whereby, for example, dry air can be introduced into the central lock 41 when desired, as will be seen below.

At least one pumping tube, such as the tube 46, opens in the peripheral sub-enclosure 42 and at least one pumping tube, such as the tube 47, opens in the central lock 41. The tube 47 comprises a flexible and extensible portion 48 and it is extended by a passage into the ring 11, opening in the lock 41 via at least one opening 49.

The pumping tube 46 is connected to an external pumping installation, which is not shown, for creating a high vacuum, for example of the order of $10^{-3}$ mm Hg. The pumping tube 47 is connected to another external pumping installation, which is not shown, for more rapidly creating a relatively lower vacuum, for example of the order of $10^{-1}$ mm Hg.

When the whole of the enclosure 3 is to be re-evacuated, it is possible initially to supply dry air to the lock 41 via the tube 43, and then, with the inflatable elements 5 and 6 being applied against the pipe lengths 1 and 2, a first vacuum is created in the lock 41 via the pumping tube 47, after which the gaskets 12, 26 and 27 are retracted and the vacuum required for welding is obtained by means of the pumping installation connected to the pumping tube 46, which acts starting from a vacuum, intermediate between the first vacuum provided by the installation connected to pumping tube 47 and the vacuum required for welding, obtained by diluting, in the whole enclosure 3, the air remaining in the central lock 41, and which thus operates under excellent conditions.

It will be noted that, apart from the advantage of reducing the volume periodically returned to atmospheric pressure (the volume of the central lock 41), the central lock 41 provides the advantage of reducing the metal surfaces subjected to re-gassing during this return to atmospheric pressure.

Of course, the constructional arrangements which have been described in this embodiment in no way imply a limitation, it being possible for them to form the subject of numerous modifications without going outside the scope of the invention.

What is claimed is:

1. A vacuum welding chamber for use in the butt welding by an electron beam of two elongate pipes which extend coaxially in their longitudinal directions at a center of the chamber, comprising: an envelope (4) defining a generally cylindrical enclosure (3) for housing at least one electron gun and associated equipment (8) for supporting, positioning and displacing the electron gun relative to a butt joint to be welded between two pipes, retractable, spaced sealing means (5,6) for sealing respectively against each of two elongate pipes (1,2) and individually provided at opposite longitudinal ends of said envelope, means (9,10,11) dividing said enclosure into two parts including a central cylindrical sub-enclosure (41) for receiving the elongate pipes when said sealing means are retracted, and a peripheral cylindrical sub-enclosure (42) radially surrounding said central sub-enclosure for containing the electron gun and associated equipment, and a plurality of retractable sealing gasket means (12,26,27) individually disposed both longitudinally between said envelope and said dividing means, and within said dividing means for selectively communicating said central and peripheral sub-enclosures with each other or isolating them from each other, whereby said peripheral sub-enclosure may be maintained constantly under vacuum, while said central sub-enclosure may be isolated from said peripheral sub-enclosure by said retractable sealing gasket means between welding operations, and placed in communication with said peripheral sub-enclosure during welding operations.

2. A chamber according to claim 1, wherein said retractable sealing gasket means comprises inflatable gaskets.

3. A chamber according to claim 1 or claim 2, wherein each of said retractable sealing gasket means comprises a pair of gasket elements arranged parallel to one another and defining therebetween an intermediate space, and comprising means for evacuating said intermediate space.

4. A chamber according to claim 2, wherein said inflatable retractable sealing gasket means (12) which are disposed within said dividing means are connected to the outside of said envelope by tubes (21,22,23), at least one portion (24) of which is flexible and extensible.

5. A chamber according to claim 3, wherein said means for evacuating said intermediate space between a pair of gasket elements (12) disposed within said dividing means comprises a tube (18), at least one portion (19) of which is flexible and extensible.

6. A chamber according to claims 1 or 2, wherein said retractable sealing gasket means (12) disposed within said dividing means are oriented to extend and retract in an axial, longitudinal direction.

7. A chamber according to claims 1 or 2, wherein said retractable sealing gasket means (26,27) disposed between said envelope and said dividing means are positioned between opposing baffles (30-33) and act transversely in a radial direction.

8. A chamber according to claim 7, wherein the arrangement and the dimensions of said retractable sealing gasket means disposed between said envelope and said dividing means are substantially identical at both longitudinal ends of said envelope.

9. A chamber according to claims 1 or 2, wherein at least one vacuum pumping tube (47) opens into said central sub-enclosure and at least one other vacuum pumping tube (46) opens into said peripheral sub-enclosure.

10. A chamber according to claim 9, wherein said pumping tube which opens into said central sub-enclosure extends into said peripheral sub-enclosure, and comprises, in said peripheral sub-enclosure, at least one flexible and extensible portion (48).

11. A chamber according to claim 10, wherein said one pumping tube opens into said central sub-enclosure via at least one opening (49) provided in a ring (11) of said dividing means, said ring forming a portion of said tube which extends into said peripheral sub-enclosure.

* * * * *